June 23, 1953
D. D. JONES
2,642,622
CONTINUOUS VULCANIZING APPARATUS
Filed April 6, 1946
2 Sheets-Sheet 1
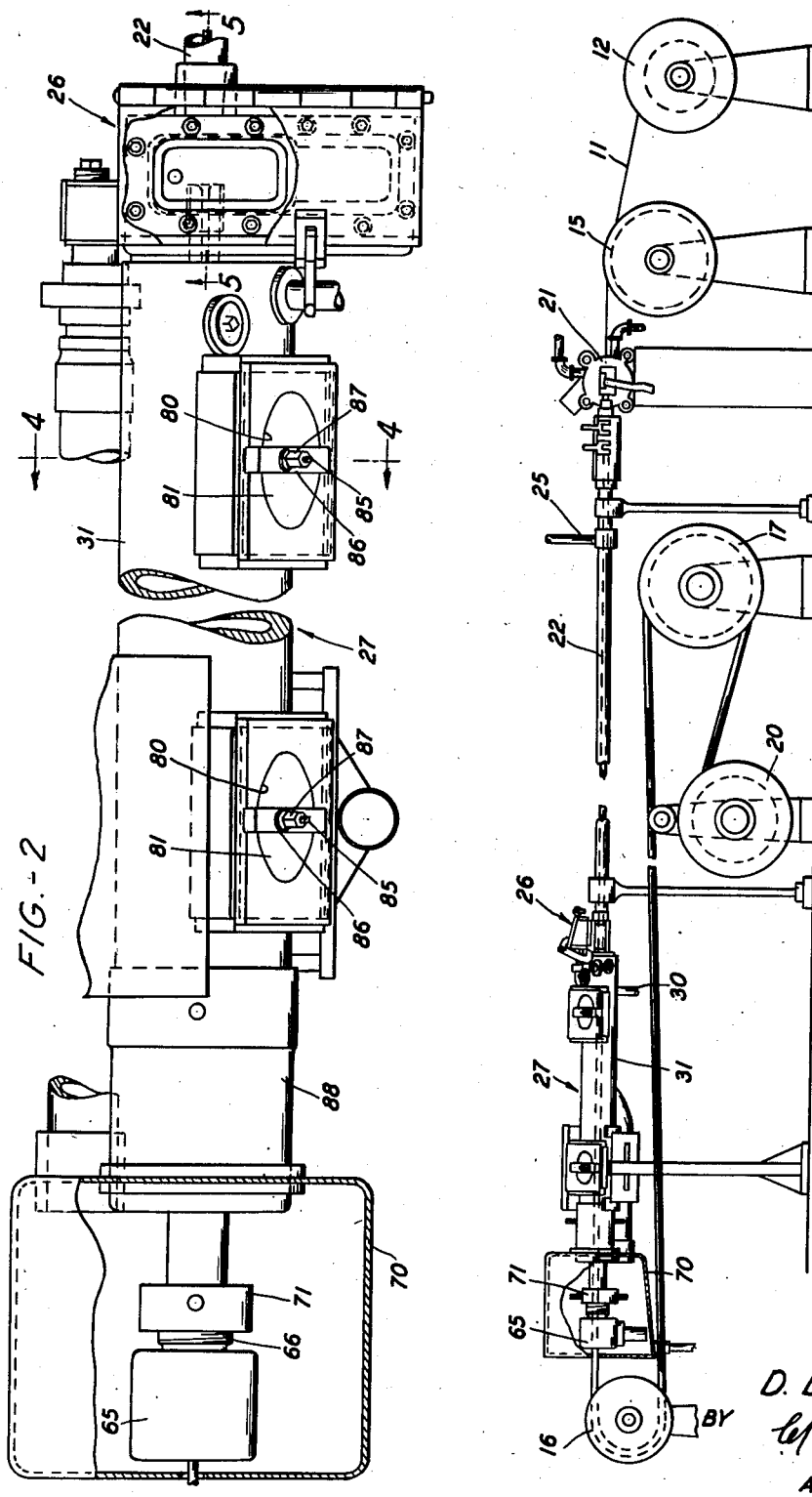
INVENTOR
D. D. JONES
BY
ATTORNEY June 23, 1953 D. D. JONES 2,642,622
CONTINUOUS VULCANIZING APPARATUS
Filed April 6, 1946 2 Sheets-Sheet 2
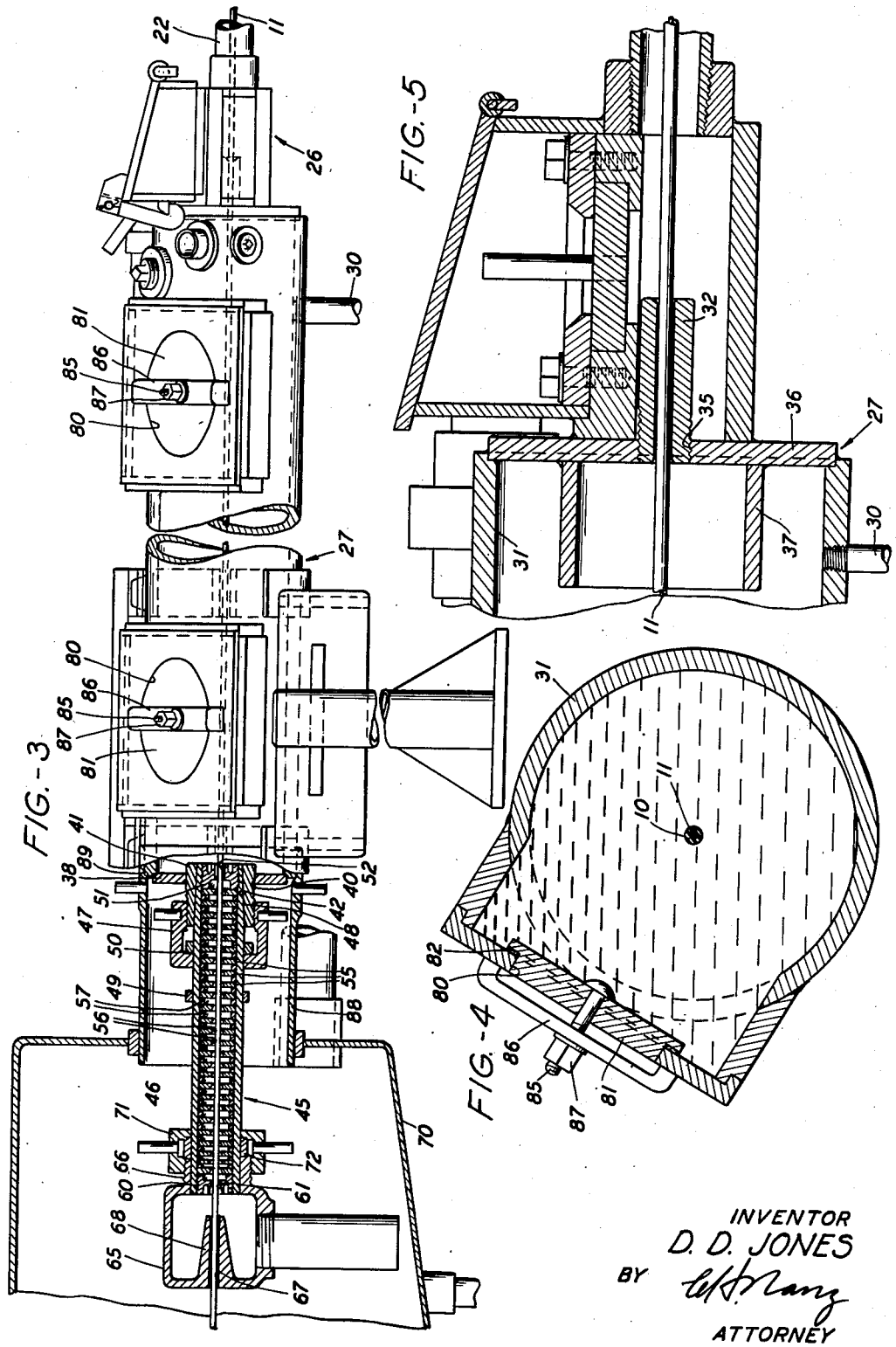
INVENTOR
D. D. JONES
BY
ATTORNEY Patented June 23, 1953

2,642,622

UNITED STATES PATENT OFFICE 2,642,622

CONTINUOUS VULCANIZING APPARATUS

David D. Jones, Weston, Conn., assignor to Western Electric Company, Incorporated, New York, N. Y., a corporation of New York Application April 6, 1946, Serial No. 660,042

4 Claims. (Cl. 18—6)

This invention relates to apparatus for continuously making vulcanized articles, and more particularly to apparatus for cooling continuous lengths of filamentary vulcanized articles emerging from vulcanizing tubes having steam under a high pressure therein and for sealing the steam in the vulcanizing tubes from the atmosphere.

In the manufacture of filamentary articles having coverings of vulcanizable compounds over cores which include elements of hygroscopic materials, such as textile materials, the cores are sometimes passed through an extruder, which extrudes tubular covers of vulcanizable compounds thereover, and then through a vulcanizing tube to vulcanize the covers. In vulcanizing tubes having steam at high temperatures and under high pressures therein, the heat of the steam vaporizes latent moisture in the hygroscopic elements of the cores. While the covers are in the vulcanizing tubes and are subjected to the high pressures of the steam, this vaporized moisture does not damage the covers. However, if the vaporized moisture is not cooled sufficiently before the article reaches the atmosphere, the pressures of the vaporized moisture may rupture the covers. In the past, rapidly flowing water under pressure has been passed through sealing devices which restrict the flow of water somewhat. Such water seals cool the articles sufficiently to reduce the internal pressure of the vaporized moisture and to toughen the covers to an extent that rupturing is prevented. However, it is difficult to keep the static pressure of rapidly flowing water high enough to prevent large losses of steam by condensation in the water. Also, if sudden surges of the steam pressure occurred in the vulcanizing tubes, the water in the seals was blown out of the seals, and the steam escaped into the atmosphere.

An object of the invention is to provide new and improved apparatus for continuously insulating and vulcanizing conductors.

Another object of the invention is to provide new and improved apparatus for cooling insulated conductors and effectively sealing steam in vulcanizing tubes with water in a manner in which sudden surges of steam in the vulcanizing tubes do not blow the sealing water out of the apparatus.

A cooling and sealing unit forming a specific embodiment of the invention includes an elongated cooling cylinder having a large diameter, which is connected with the exit end of a vulcanizing tube of a continuous extrusion and vulcanization machine, and a sealing unit mounted at the exit end of the cylinder. A filamentary conductor is advanced continuously through the extruding and vulcanizing machine, in which an extruder applies a tubular cover of vulcanizable compound upon the conductor. The covered conductor passes through the vulcanizing tube into which steam under high pressure is introduced, and the steam heats and vulcanizes the compound. The resulting insulated conductor then passes from the vulcanizing tube into and through the cooling cylinder and the sealing unit. Water under high pressure is fed into and fills the cooling cylinder and prevents the escape of the steam from the vulcanizing tube into the cylinder. A small quantity of the water in the cylinder constantly flows therefrom through the sealing unit, but the quantity of water thus flowing is so small that there is very little motion of the water in the cylinder so that it has a high static pressure, which effectively prevents the escape of steam from the vulcanizing tube into the cylinder.

A complete understanding of the invention may be obtained from the following detailed description of apparatus forming specific embodiments thereof, when read in conjunction with the appended drawings, in which:

Fig. 1 is a fragmentary, side elevation of an apparatus forming one embodiment of the invention;

Fig. 2 is an enlarged, fragmentary plan view thereof;

Fig. 3 is an enlarged side elevation of the portion of the apparatus shown in Fig. 2, with a part thereof shown in vertical section;

Fig. 4 is an enlarged, vertical section taken along line 4—4 of Fig. 2, and

Fig. 5 is an enlarged, fragmentary, vertical section taken along line 5—5 of Fig. 2.

Referring now in detail to the drawings, there is shown therein a continuous extruding and vulcanizing machine for forming and vulcanizing protective cover 10 (Fig. 4) over a filamentary conductor 11 to form a covered conductor. In forming the cover upon the conductor, the conductor is advanced continuously from a supply reel 12 at a high rate of speed by a supply capstan 15, and is advanced continuously from the supply capstan 15 over a return sheave 16 by a takeup capstan 17 to a takeup reel 20. As the conductor 11 is drawn from the supply capstan 15, it passes through an extruder 21, which extrudes a tubular cover of vulcanizable insulating compound thereon.

The covered conductor then passes into an elongated vulcanizing tube 22, which has steam under a high pressure supplied thereto by a steam pipe 25, whereby the insulating compound is completely vulcanized. The resulting covered conductor passes from the vulcanizing tube into and through a splice box 26, and thence into and through a cooling and sealing unit 27 arranged in tandem with the splice box. Since the vulcanizing tube 22 and the splice box 26 are joined together and they both are filled with steam under high pressure, they form a continuous vulcanizing chamber.

A water pipe 30 serves to constantly introduce cold water, under a pressure substantially equal to that of the steam in the vulcanizing tube and splice box, into an elongated cooling cylinder 31 having a diameter substantially larger than that of the vulcanizing tube 22. The covered conductor passing from the vulcanizing tube 22 into the cooling cylinder 31 passes through a bushing 32 (Fig. 5) threaded into a tapped bore 35 formed in an end plate 36 of the cooling cylinder. The inner diameter of the bushing 32 is only slightly larger than the outer diameter of the covered conductor passing therethrough. As a result of the small amount of clearance for the covered conductor, the flow of steam and debris from the vulcanizing tube and the splice box into the cooling cylinder, and also the flow of cooling water from the cooling cylinder into the splice box and vulcanizing tube, are greatly restricted. A cylindrical baffle 37 is supported by the end plate 36 in a position concentric with the cylinder 31 and prevents water from the inlet pipe 30 from forcing the insulated conductor against the bushing 32, thereby avoiding scraping of the protective cover 10.

An end plate 38 (Fig. 3) secured on the opposite end of the cooling cylinder 31 has a hole 40 therein, in which is secured a nipple 41 having a tapered passage 42 therein. A sealing unit 45 mounted in alignment with the cooling cylinder 31 includes a sealing tube 46 having a tapered end 48, which fits tightly into the tapered passage 42 formed in the nipple 41. A coupling nut 47 mounted between collars 49 and 50 on the sealing tube 46 is threaded upon the nipple 41, and engages the collar 50 to hold the tapered end portion 48 of the sealing tube 46 in close engagement with the tapered passage 42 in the nipple 41.

A plug 51 having an axial passage 52 therein is threaded into the entrance end of the sealing tube 46 and serves to retain a plurality of baffles 55—55 in the sealing tube. The baffles 55—55 are provided with flow-restricting orifices 56—56, and are separated by spacers 57—57 so that the sealing unit greatly restricts flow of water from the cylinder 31 therethrough. A plug 60 threaded into the exit end of the sealing tube 46 has a passage 61 formed therein, which is aligned with the passage 52 formed in the plug 51 and the flow-restricting orifices 56—56 formed in the baffles 55—55. A deflector 65 having a nipple portion 66 also is provided with a passage 67, which is formed in an inwardly projecting cylindrical boss 68 thereof, for the insulated conductor, which is aligned with the sealing unit 45 and the cylinder 31. The deflector 65 serves to deflect water passing through the sealing unit to a draining device 70. A coupling nut 71 threaded on the nipple portion 66 of the deflector engages a collar 72 to form a seal between the exit end of the sealing cylinder 46 and the deflector 65.

Handholes 80—80 (Figs. 3 and 4) formed in the cylinder 31 normally are closed by covers 81—81 which are held against sealing gaskets, one of which designated 82 is shown in Fig. 4, by bolts 85—85, spiders 86—86 and nuts 87—87 threaded on the bolts. The covers may be removed to clean out debris or scrap from the cylinder 31 and also facilitate initially threading the conductor 11 through the sealing device, in which operation the splice box 26 aids.

A sleeve-like cover 88 mounted slidably in a guide 89 may be slid to the left, as viewed in Fig. 3, to provide access to the sealing unit 45 and the end of the cooling cylinder 31. The sealing unit 45 then may be easily detached from the cooling cylinder 31 by unscrewing the coupling nut 47. The deflector 65 may be separated from the sealing unit, and the plugs 51 and 60 may be unthreaded from the ends of the sealing tube 46 to permit the removal of the baffles 55—55 and the spacers 57—57 for the purpose of cleaning or replacing them.

In the cooling the covered conductor 11 and sealing the vulcanizing tube 22, the covered conductor is drawn through the cooling and sealing unit 27 at a high rate of speed. Water under a static pressure substantially equal to, but slightly below, that of the steam in the vulcanizing tube 22 and the splice box 26 is supplied to the large cylinder 31 through the pipe 30 and fills the cylinder. This water escapes slowly through the sealing unit 45 so that the water in the cylinder 31 has very little linear flow therein. Since the water in the cooling cylinder is relatively motionless, its total pressure is almost completely static pressure.

The high static pressure of the water in the cooling cylinder 31, its static condition therein and the small bushing 32 substantially prevent the entrance of steam from the splice box 26 and the vulcanizing tube 22 into the cylinder so that there is very little loss of steam. Also, since the body of water in the cylinder is large and is almost motionless, its static pressure may be kept close to that of the steam more easily than if there was a rapid flow of water therein. This large static body of water and the restriction of the flow thereof by the sealing unit 45 prevent blowing all of the water out of the seal 27 if sharp increases in the pressure of the steam occur. The cooling and sealing unit 27 serves to cool the covered conductor sufficiently to toughen the cover 10 and to reduce the pressure of any internal gases, such as vaporized moisture, to such an extent that the cover is not ruptured by these gases when it emerges into the atmosphere.

The large diameter of the cooling cylinder 31 facilitates regulation of the static pressure of water therein which is exceedingly difficult in the small diameter water seals heretofore known, in which seals the water has a high velocity and the static pressure is low. Also, this low static pressure of water in the former seals permits large quantities of steam to enter the seals and condense in the water, whereby the water is heated to an extent impairing its cooling function and entailing high steam losses.

What is claimed is:

1. In a continuous vulcanizing apparatus, means for advancing a conductor having a vulcanizable cover through the apparatus, a tubular vulcanizing chamber having an exit for permitting such an advancing conductor to be continuously withdrawn from the vulcanizing chamber, means for introducing steam under high pressure into the vulcanizing chamber to vulcanize the cover, an elongated open cylinder having a body portion mounted at its entrance end in communication with and in alignment with the exit of the vulcanizing chamber, said cylinder serving to hold a large quantity of water, a supply pipe for directing cold water into the cylinder near the entrance end thereof under a pressure substantially equal to that of the steam in the vulcanizing chamber to seal the steam in the vulcanizing chamber, a cylindrical baffle positioned concentrically within the cylinder for separating the entrance passage in the cylinder from the supply pipe, and an elongated sealing unit mounted at the exit end of the cylinder for restricting the flow of water from the cylinder to keep the water in the cylinder substantially static and to maintain the water in the cooling cylinder under a static pressure substantially equal to its initial pressure, said sealing unit including an elongated tube, a plurality of baffles having flow-restricting orifices therein and means for spacing the baffles in the tube.

2. In a continuous vulcanizing apparatus, means for advancing a conductor having a vulcanizable cover through the apparatus, a vulcanizing tube through which such a conductor is advanced, a splice box secured to the exit end of the vulcanizing tube and having an exit for permitting such an advancing conductor to be continuously withdrawn therefrom, means for introducing steam under high pressure into the vulcanizing tube and the splice box to vulcanize the cover, an elongated, hollow cylinder mounted at its entrance end in alignment with and abutting the exit of the splice box so that fluids may flow therebetween while the conductor is advancing therethrough, said cylinder serving to hold a large quantity of water, a supply pipe for directing cold water into the cylinder near the entrance end thereof under a pressure slightly less than that of the steam in the vulcanizing tube and splice box so that the water does not flow into the splice box, and a labyrinth sealing unit mounted at the exit end of the cylinder for restricting the flow of water therefrom to keep the cylinder filled with a substantially static body of cold water under a pressure substantially equal to its initial pressure which minimizes the escape of steam from the splice box and cools the covering without materially reducing the pressure thereon, said cylinder being sufficiently long to insure cooling of the covered conductor to the point where any internal pressures developed therein during the vulcanization of the covering are rendered harmless before the covered conductor leaves the cylinder.

3. In a continuous vulcanizing apparatus, means for advancing a conductor having a vulcanizable cover through the apparatus, a tubular vulcanizing chamber having an exit for permitting such an advancing conductor to be continuously withdrawn from the vulcanizing chamber, means for introducing steam under high pressure into the vulcanizing chamber to vulcanize the cover, an elongated open cylinder having a body portion mounted at its entrance end in communication with and in alignment with the exit of the vulcanizing chamber, said cylinder serving to hold a large quantity of water, a bushing in the exit of the vulcanizing chamber which is so restricted as to permit the conductor to pass therethrough continuously into the cylinder but to allow only a small amount of fluid to flow therethrough around the conductor, a supply pipe for directing cold water into the cylinder near the entrance end thereof under a pressure substantially equal to that of the steam in the vulcanizing chamber to seal the steam in the vulcanizing chamber, a cylindrical baffle positioned concentrically within the cylinder for separating the entrance passage in the cylinder from the supply pipe, and an elongated, labyrinth sealing unit mounted at the exit end of the cylinder for restricting the flow of water from the cylinder to keep the water in the cylinder substantially static and to maintain the water in the cooling cylinder under a static pressure substantially equal to its initial pressure.

4. In a continuous vulcanizing apparatus, means for advancing a conductor having a vulcanizable covering through the apparatus, a vulcanizing tube through which such a conductor is advanced, a splice box secured to the exit end of the vulcanizing tube, means for introducing steam under high pressure into the vulcanizing tube and the splice box to vulcanize the covering on the conductor, an elongated, hollow cylinder mounted at its entrance end in alignment with and abutting the exit end of the splice box, a restricted bushing at the exit of the splice box through which such a conductor may be continuously advanced from the splice box into the cylinder but permitting only limited amounts of fluid to flow therethrough around the advancing conductor, a supply pipe for directing cold water into the cylinder near the entrance end thereof under a pressure slightly less than that of the steam in the vulcanizing tube and splice box so that the water does not flow into the splice box, and a labyrinth sealing unit mounted at the exit end of the cylinder for restricting the flow of water therefrom to keep the cylinder filled with a substantially static body of cold water under a pressure substantially equal to its initial pressure which minimizes the escape of steam from the splice box and cools the covering without materially reducing the pressure thereon, said cylinder being sufficiently long to insure cooling of the covered conductor to the point where any internal pressures developed therein during the vulcanization of the covering are rendered harmless before the covered conductor leaves the cylinder.

DAVID D. JONES.

References Cited in the file of this patent

UNITED STATES PATENTS

| Number | Name | Date |
|---|---|---|
| 2,069,087 | Forstrom et al. | Jan. 26, 1937 |
| 2,230,283 | Boggs | Feb. 4, 1941 |
| 2,291,344 | Powell | July 28, 1942 |
| 2,373,816 | De Roche et al. | Apr. 17, 1945 |
| 2,426,341 | Canfield | Aug. 26, 1947 |

FOREIGN PATENTS

| Number | Country | Date |
|---|---|---|
| 864,121 | France | Jan. 8, 1941 |